Patented Mar. 25, 1952

2,590,211

UNITED STATES PATENT OFFICE 2,590,211

FLAMEPROOF THERMOPLASTIC MOLDING COMPOSITIONS

George F. Rugar, Willoughby, Ohio, assignor to Diamond Alkali Company, Cleveland, Ohio, a corporation of Delaware No Drawing. Application September 18, 1947, Serial No. 774,896

7 Claims. (Cl. 106—15)

This invention relates to fire and flameproofing compositions particularly for application to thermoplastic materials and especially to rendering such materials fire and flameproof while still retaining the property of being moldable, and also relates to the fire and flameproof thermoplastic materials themselves. The invention, in addition, relates to methods for preparing, compounding, and molding the fire and flameproof thermoplastic materials.

The invention, in general, contemplates the provision of a flameproofing composition comprising a highly chlorinated organic material, combined with an inorganic flame retardant substance, which composition is suitably stabilized with a carefully selected stabilizing agent having a stabilizing influence upon the decomposition of the chlorinated material under ordinary conditions and which stabilizer has substantially no stabilizing effect at flame temperatures. Other materials which may optionally be included in the composition are plasticizers and lubricants, the latter component being particularly important in the primary application of the present invention, which is in plastic materials for injection molding purposes.

It has heretofore been proposed to provide flameproofing compositions comprising highly chlorinated organic materials and inorganic flame retardant substances. However, these prior suggestions have gone to the use of such materials as applied to fabric or fibrous material in which connection they presumably are substantially satisfactory. The use, however, in connection with thermoplastic materials, particularly plastic materials for injection molding, has not heretofore been suggested despite a pressing need in the art for flameproof thermoplastic injection molded articles of manufacture.

It has also been suggested to render injection molded plastic materials flameproof by various and sundry expedients, none of which has enjoyed any degree of success, and none of which has experienced successful commercial application. One of the more pertinent of these prior suggestions has been the combination of chlorinated diphenyl with various thermoplastic materials of which polystyrene is an example. Whatever flameproofing properties of value this composition may have, it is entirely unusable in molding compositions because of the high toxicity representing a real danger to health and life, which characterizes chlorinated diphenyl when its vapor pressure approaches any appreciable amount whatsoever as it does at relatively low temperatures, such as molding or thermoplastic temperatures.

The field of injection molded thermoplastic material has been broadening for a considerable period of time but is limited at the present time in the applications to which this material may be applied not because of the physical properties of the material, which in many cases are optimum, but mainly because materials of a thermoplastic character are to a large extent inflammable and thus may not be used in any applications where fire is a possibility. Included in these presently forbidden uses of thermoplastic materials of this character are all electrical applications, including such applications as switch plates, switch boxes, fuse boxes, containers of various sorts for wires and the like. Additional applications for which thermoplastic materials of this general class would have high use in the event that the fire hazard involved did not exist, are housings for electric motors on domestic and manufacturing equipment, frames, coverings and housings for domestic and commercial electrical apparatus, such as refrigerators, freezers, washers, and the like, and in particular structural elements, such as wall tile and the like.

It is well understood that in order for any material to be used in such applications, the approval of the Fire Underwriters Laboratories of the material for the purpose to be used is necessary. Heretofore, the Fire Underwriters Laboratories have unanimously failed to approve any inflammable thermoplastic materials for any of the above-mentioned uses, whereby these materials have been considerably limited in their application in the arts because of their high inflammability.

As noted above, the present invention envisions the solution of the problem of general application of thermoplastic materials to these various now forbidden uses by flameproofing the plastic materials to a point that the compounded materials utterly fail to support combustion. The expression "to support combustion" in this connection is meant to convey that when a flame, such as a flame of burning wood or the like, is applied to the material and is allowed to remain in contact with the material until the same appears itself to flame and is then removed, the flame on the plastic material disappears within a period of no more than three seconds and usually in a period of no more than one second.

In contrast to this property of the flameproofed materials of this invention, thermoplastic resins of which polystyrene having a molecular weight of between 50,000 and 150,000 is an example, burns readily upon the removal of the flame therefrom until the object of polystyrene is entirely consumed. A similar object to which a similar flame from burning wood is applied, which material has incorporated therein the flameproofing composition of this invention, burns for less than two seconds after the flame has been removed therefrom.

In accordance with the present invention, a plastic material to be flameproofed may be treated preferably in partially or completely polymerized state. The flameproofing ingredients of this invention may suitably be combined with the polymerized material by highly efficient mixing. For this purpose may be used a rubber mill or other well-known type mixers suitably adapted for thorough combination of semi-plastic materials. No special steps are required in obtaining the combination of the ingredients, each may be added separately to the thermoplastic material, or all may be added to the thermoplastic material at one time.

As examples of plastic materials of the thermoplastic type, which may be rendered flameproof by combination with the composition of this invention, may be mentioned natural and synthetic thermoplastic materials, such as natural and synthetic rubber, polystyrene, cellulose acetate butyrate or propionate, cellulose acetate, polyethylene, ethyl cellulose, methyl methacrylate and derivatives of methyl methacrylate, such as ethyl, iso-propyl, butyl, and other methacrylates, vinyl chloride, and the like. The invention, however, is generally applicable to thermoplastic materials particularly for molding plastics, especially by injection molding and the above specifically mentioned examples of plastics to which it is applied, is given for the purpose of guiding those skilled in the art.

As noted above, the flameproofing composition of this invention comprises a mixture of a highly chlorinated organic material, an inorganic flame retardant material, a stabilizer for the chlorinated material, and certain other optional additives. The highly chlorinated organic material may comprise any higher molecular chlorinated organic substance containing between 50% and 80% of chlorine, such as chlorinated aliphatic or cyclo aliphatic compounds containing more than eight carbon atoms, examples of which are paraffin hydrocarbons, waxes, fats, oils, higher fatty acids, higher fatty acid esters, and the like. The inorganic flame retardant substance may suitably be chosen from the group of bismuth oxide, arsenic oxide, antimony sulfide, bismuth sulfide, arsenic sulfide and antimony oxide, in general, it being preferred to employ antimony oxide for its easy availability and high flameproofing actiivty with the chlorinated organic material.

As noted above, it is preferable to employ in this connection a stabilizer for the chlorinated organic component of the flameproofing composition but such stabilizer must be carefully selected from various stabilizers which might be used, in that it must not have sufficient activity to prevent the release of hydrogen chloride from the chlorinated material at high temperatures approaching flame temperatures, while still having sufficient activity to prevent the release of hydrogen chloride at relatively low temperatures, particularly temperatures which may be encountered on a rubber mill or in a heated mixer, or in injection molding, wherein the plastic material under treatment is at a temperature within its thermoplastic range, such as temperatures of the order of 300–450° F. Examples of such materials accordingly are high melting derivatives of ethylene oxide, the derivatives being chosen as having a boiling temperature or at least a temperature of appreciable vapor pressure well above that temperature found necessary for the mixing or molding of the plastic material with the flameproofing ingredients. Examples of such materials which are applicable in this connection, depending upon their boiling temperature, are derivatives of ethylene oxide, propylene oxide, butylene oxide, phenyl ethylene oxide, tolyl ethylene oxide, diphenyl ethylene oxide, phenoxy propylene oxide, diethyl ethylene oxide, benzyl ethylene oxide, epichlorhydrin, glycide or its ethers, such as methyl-, ethyl-, propyl-, tolyl-, alpha or beta naphthyl-, also cyclopentene oxide, cyclohexene oxide, and the like. In general, and in accordance with the above disclosure, compounds having an ethylene oxide linkage contained therein and in addition, having a sufficiently high boiling point so that their vapor pressure is not appreciable at the temperature at which the entire material is compounded and molded, are suitable in this connection. Particularly advantageous members of this group of substances are aroxyl substituted propylene oxides, of which phenoxy propylene oxide is an especially suitable member.

In addition may be used as stabilizers of the general character set forth above, alkaline earth metal salts of aliphatic acids having from five to ten carbon atoms, of which strontium caprylate is an example. Another class of substances particularly suited for this stabilizing purpose are the tetra aryl and alkyl substituted compounds of tin in which the alkyl or aryl groups have from four to twelve carbon atoms and of which tetra butyl tin, tetra phenyl tin, dibutyl diphenyl tin, and dibutyl tin dilaurate are examples. Further examples of stabilizers useful in this connection will occur to those skilled in the art, it being emphasized that the stabilizer to be effective must prevent the substantial evolution of hydrogen chloride from the chlorinated paraffin at room and molding temperatures, such as 300–450° F., while being insufficiently of a stabilizing influence to prevent the substantial release of hydrogen chloride at flame temperatures.

It will be appreciated by those skilled in the art that various plasticizers may be added to these compositions either before compounding with the actual plastic materials or during the compounding of the flameproofing composition with the plastic materials. Such plasticizers may include phosphoric acid derivatives, such as tricresyl phosphate, triphenyl phosphate and ethyl hexyl phosphate, phthalates, such as dibutyl phthalate and di octyl phthalate, sebacates, such as di octyl sebacate, ricinoleates, such as butyl ricinoleate, glycol derivatives, such as triethylene glycol di-2-butyrate, sulfonamides, such as o- and p-toluene ethyl sulfonamide, laurates, such as amyl laurate and the like.

In addition and in particular, to enhance the ease of the injection molding operation where these materials are applied in such applications, the addition of a small percentage of lubricating material, which has the effect of enabling the material to be injection molded without adhering too securely to the molds, thus preventing easy removal, may be employed. Examples of such materials are oleic and stearic acids, alkaline earth stearates and oleates, such as calcium stearate, calcium oleate, and the like.

The flameproofing composition may therefore comprise a mixture of the essential flameproofing ingredients, including the chlorinated organic material of which chlorinated paraffin, having above 50% of chlorine and preferably between 50% and 80% chlorine, suitably about 70% thereof, is an example, the inorganic flame retardant material of which antimony oxide is an example, and the stabilizer of which phenoxy propylene oxide is an example. These materials may be used in various quantities to make up a flameproofing composition to be combined with one or more of the thermoplastic materials set forth above. In general, it is preferred to use a composition comprising not over 75% of chlorinated organic material and at least 25% thereof, with a substantially correspondingly inverse amount of the inorganic material, such as antimony oxide, that is, between 25% and 75% thereof. The stabilizing material may be added in an amount equal to between 1-10% of the chlorinated organic material used, preferably about 5% of the chlorinated organic material used, and will reduce the proportion of the two other components accordingly. If desired, the plasticizing material may be added to the flameproofing material and have its subsequent effect in the completed fire resistant plastic composition. Where it is necessary to use substantial quantities of plasticizer, such as 10% and above, the employment of flame resistant plasticizers, such as chlorinated paraffins and phosphoric acid derivatives, is preferred. In general, however, the use of plasticizers in amounts of less than 10% of the flameproofed plastic mass is found satisfactory and in such amounts, the other plasticizers herein disclosed may be used. The lubricant material may also be included in the flameproofing composition, if desired, and may be added in an amount equal to about 1% to 5% of the final plastic mixture.

In general, for a desirably flameproofed plastic material which may suitably be molded as by injection molding, the flameproofing material should be added to the plastic material in an amount equal to not more than 50% of the entire plastic material and is preferably added in an amount equal to at least 15% of the final flameproof plastic composition.

In order to inform those skilled in the art of the preferred ways of practicing this invention but in no sense to be taken as limiting the scope of the present invention, the following specific examples are set forth.

*Example 1*

A composition is prepared containing the following ingredients and in the following proportions: 10 parts of chlorinated paraffin containing approximately 70% of chlorine, 15 parts of antimony oxide, 0.6 part of tricresyl phosphate, 0.5 part of phenoxy propylene oxide, and 73.9 parts of cellulose acetate butyrate in substantially polymerized form. The composition is prepared on a rubber mill as follows: The fast roll of the rubber mill is maintained at 250° F. and the slow roll of the mill at 300° F. The cellulose acetate butyrate is placed on the mill and is treated alone by the mill until in well-milled condition. The remaining ingredients, having been previously mixed together, are added to the mill in components of about ⅓ of the total quantity thereof at a time with sufficient time being given after each addition of the flameproofing ingredients to permit the complete mixing of the previously added quantity of the flameproofing composition. When completely milled, the composition obtained is absolutely flame resistant, that is, a flame applied thereto is self-extinguishing in about one second. The flameproof composition has flexural strength comparable to that of untreated cellulose acetate butyrate and tensile and impact strengths of the same order.

*Example 2*

A composition is prepared containing the following materials: 10 parts of chlorinated paraffin containing about 70% of chlorine, 10 parts of antimony oxide, 0.6 part of tricresyl phosphate, and about 0.5 part of phenoxy propylene oxide. This is added on a rubber mill to a well-milled sample comprising 78.9 parts of polymerized styrene. The fast roll is maintained at about 250° F. and the slow roll varies between 200–215° F. The flameproofing composition is added to the milled plastic material on the roll in components of about ⅓ of the total and complete mixing is effected after each addition. Milling for about 15 minutes, following the completion of the addition of the flameproofing material, is had. The resulting material is flameproof in the sense that a flame does not support itself on the material for more than one second; its tensile, impact and flexural strengths are comparable to untreated polystyrene.

In the case of both Examples 1 and 2, the flameproof plastic material, upon being injection molded to form various objects heretofore formed from untreated plastic materials, such as, for example, wall tiles and the like, was found to be admirably suited for injection molding and to produce injection molded articles having the same flameproof character as the unmolded material.

*Example 3*

77.9 parts of polystyrene are applied to a rubber mill and milled for about 10 minutes. To this milled polystyrene in components of about ⅓ of the total mixture of flameproofing ingredients is added a mixture comprising 10 parts of chlorinated paraffin having about 70% of chlorine therein, 10 parts of antimony oxide, 0.6 part of tricresyl phosphate, 0.5 part of phenoxy propylene oxide, and 1 part of calcium stearate. After milling in the manner described above and cooling the resulting milled material, it was found that upon grinding and subsequent melting in an injection molding machine, the material incorporating the calcium stearate as a lubricant could be molded with somewhat more facility in that the material did not adhere to the mold quite as strongly as the unlubricated material.

*Example 4*

74.2 parts of natural smoked sheet rubber are applied to a rubber mill and milled until in plastic form. To this milled rubber is added a mixture of flameproofing ingredients as follows: 9.5 parts of chlorinated paraffin having about 70% of chlorine, 14.3 parts of antimony oxide, 0.9 part of calcium stearate, and 0.5 part of phenoxy propylene oxide. After milling for about 5 minutes, the sample is removed from the mill. This material fails to support combustion for more than three seconds.

5 parts of zinc oxide, 2.5 parts of sulfur, 1 part of stearic acid, and 1.15 parts of accelerator, all based upon 100 parts of untreated rubber, are combined with the flameproofed uncured rubber composition and compression molded at 287° F. for 10 minutes with a pressure of 2,000 lbs. on the platens. Upon completion of the cure, the sample is found to possess comparable flame resistance to the uncured material; it has tensile strength slightly less than cured smoked sheet rubber.

While there have been described various embodiments of the invention, the products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter consisting of a moldable thermoplastic composition of substantial flameproof properties, said composition being an intimate mixture of at least 50% of a thermoplastic material and at least 15% of a flameproofing mixture, said thermoplastic material and said flameproofing mixture being substantially 100% of said composition, said flameproofing mixture consisting of a highly chlorinated organic aliphatic compound having more than 8 carbon atoms and between 50% and 80% of chemically combined chlorine, an inorganic flame retardant compound selected from the group consisting of bismuth oxide, arsenic oxide, antimony oxide, bismuth sulfide, arsenic sulfide, and antimony sulfide, and a stabilizer for said highly chlorinated organic composition, said stabilizer having inappreciable vapor pressure at temperatures of the order of 300-450° F., having a stabilizing influence at such temperatures, and having inappreciable stabilizing influence at flame temperatures.

2. A composition as claimed in claim 1 wherein said flameproofing mixture includes chlorinated paraffin having more than 50% chlorine.

3. A composition as claimed in claim 1 wherein said thermoplastic material is polystyrene.

4. A composition as claimed in claim 1 wherein said thermoplastic material is cellulose acetate butyrate.

5. A composition of matter as claimed in claim 1 wherein said thermoplastic material is rubber.

6. A composition as claimed in claim 1 wherein said stabilizer contains an epoxy linkage.

7. A composition as claimed in claim 1 wherein said stabilizer is phenoxy propylene oxide.

GEORGE F. RUGAR.

REFERENCES CITED

The following references are of record in the file of this patent:

UNITED STATES PATENTS

| Number | Name | Date |
| --- | --- | --- |
| 2,073,004 | Engelhardt | Mar. 9, 1937 |
| 2,125,393 | Nelles et al. | Aug. 2, 1938 |
| 2,299,612 | Clayton | Oct. 20, 1942 |
| 2,378,715 | Leatherman | June 19, 1945 |
| 2,421,409 | Brookman et al. | June 3, 1947 |
| 2,428,282 | Kemmler | Sept. 30, 1947 |
| 2,462,422 | Plambeck | Feb. 22, 1949 |

FOREIGN PATENTS

| Number | Country | Date |
| --- | --- | --- |
| 418,230 | Great Britain | Oct. 22, 1934 |

OTHER REFERENCES

"Handbook of Plastics," by Simonds & Ellis, 1943, published by D. Van Nostrand Co., New York, N. Y., p. 581.

Chemical Industries, February 1944, pp. 203–205.